US011136730B2

(12) United States Patent
Shah et al.

(10) Patent No.: US 11,136,730 B2
(45) Date of Patent: Oct. 5, 2021

(54) SYSTEM AND APPARATUS FOR DYNAMIC PAVEMENT MARKINGS

(71) Applicant: Ford Global Technologies, LLC, Dearborn, MI (US)

(72) Inventors: Ayush Shah, Belleville, MI (US); Oliver Lei, Windsor (CA); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/581,140

(22) Filed: Sep. 24, 2019

(65) Prior Publication Data

US 2021/0087756 A1  Mar. 25, 2021

(51) Int. Cl.
*E01C 17/00* (2006.01)
*H04W 4/46* (2018.01)
*G08G 1/01* (2006.01)
*G08G 1/087* (2006.01)

(52) U.S. Cl.
CPC ............ *E01C 17/00* (2013.01); *G08G 1/0116* (2013.01); *G08G 1/087* (2013.01); *H04W 4/46* (2018.02)

(58) Field of Classification Search
CPC .......... E01C 17/00; E01F 9/559; E01F 9/582; E01F 9/20; E01F 9/30; G08G 1/0145; G08G 1/08; G08G 1/0116; G08G 1/052; G08G 1/096716; G08G 1/087; B60W 40/04; H04W 4/46

USPC ......................................................... 340/907
See application file for complete search history.

(56) References Cited

U.S. PATENT DOCUMENTS

| | | | | |
|---|---|---|---|---|
| 6,789,915 B2* | 9/2004 | Van Der Poel | ......... | E01F 9/582 362/153.1 |
| 7,021,857 B2* | 4/2006 | Van Der Poel | ........ | G08G 1/164 340/932 |
| 7,025,525 B2* | 4/2006 | Van Der Poel | ........ | G08G 1/164 340/932 |
| 7,347,643 B2* | 3/2008 | Jeong | ...................... | E01F 9/559 340/928 |
| 7,739,030 B2* | 6/2010 | Desai | ..................... | B62D 61/08 701/117 |
| 7,970,530 B2* | 6/2011 | Desai | ....................... | B60N 2/01 701/117 |

(Continued)

*Primary Examiner* — Eric Blount
(74) *Attorney, Agent, or Firm* — Michael Spenner; Eversheds Sutherland (US) LLP

(57) ABSTRACT

A method includes positioning one or more roadway sensors and a plurality of a networked array of light emitting diode (LED) raised pavement markers on a road. Sensors proximate the road are associated with a network of road marking controllers that cooperate to control the LEDs as vehicles drive on the road. The LEDs operate as a networked array of roadway lane marking lights. The road marking controller(s) determine a distance between a vehicle on the road and the roadway sensor, determine a dynamic condition associated with the vehicle that changes with respect to time, and lights the plurality of LEDs based at least in part on the distance between the vehicle and the roadway sensor and the dynamic condition associated with the vehicle. Dynamic conditions for operating the LED lighting scheme can include vehicle velocity, a date, a time, a weather condition proximate the vehicle, and other factors.

19 Claims, 10 Drawing Sheets

(56) References Cited

U.S. PATENT DOCUMENTS

| | | | | |
|---|---|---|---|---|
| 8,704,676 | B2* | 4/2014 | Hawkes | E01F 9/559 |
| | | | | 340/815.4 |
| 9,460,618 | B1* | 10/2016 | Soltesz | G08G 1/0145 |
| 9,536,425 | B1* | 1/2017 | Soltesz | G08G 1/09675 |
| 9,702,098 | B1* | 7/2017 | King | G08G 1/0116 |
| 10,150,471 | B2* | 12/2018 | Funk | B60W 10/30 |
| 10,577,763 | B2* | 3/2020 | Langford | G08G 1/0133 |
| 10,733,878 | B2* | 8/2020 | Soltesz | G08G 1/096716 |
| 2004/0047685 | A1* | 3/2004 | Van Der Poel | E01F 9/559 |
| | | | | 404/9 |
| 2004/0091313 | A1* | 5/2004 | Zhou | E01C 1/002 |
| | | | | 404/1 |
| 2007/0048084 | A1* | 3/2007 | Jung | G09F 9/35 |
| | | | | 404/9 |
| 2012/0194353 | A1* | 8/2012 | Groves | G08G 1/095 |
| | | | | 340/907 |
| 2013/0113618 | A1* | 5/2013 | Flanagan | E01F 9/559 |
| | | | | 340/539.1 |

* cited by examiner

__(1)__

SYSTEM AND APPARATUS FOR DYNAMIC PAVEMENT MARKINGS

TECHNICAL FIELD

The present disclosure relates to interactive roadway systems, and more particularly, to computer-controlled dynamic pavement with interactive marking.

BACKGROUND

Driving motor vehicles can be difficult in some situations where a driver's view of the road and surroundings is geographically constrained and thus the available time to react to hazardous road and weather conditions are limited. For example, driving speed on a two-lane road may be encumbered by slow-moving vehicles, which may lead cars following the slow traffic to attempt to pass the slow-moving vehicles in the lane reserved for oncoming traffic. While this practice may be generally safe in some limited circumstances, in mountainous areas and other places with a limited view, passing slow traffic using two lane highways can be difficult. Further, in situations where emergency vehicles such as ambulances, fire trucks, and police cars must take priority control of the roadway, quick access to the emergency area may be unnecessarily slowed as the non-emergency traffic attempt to clear a path for the emergency vehicles to pass.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
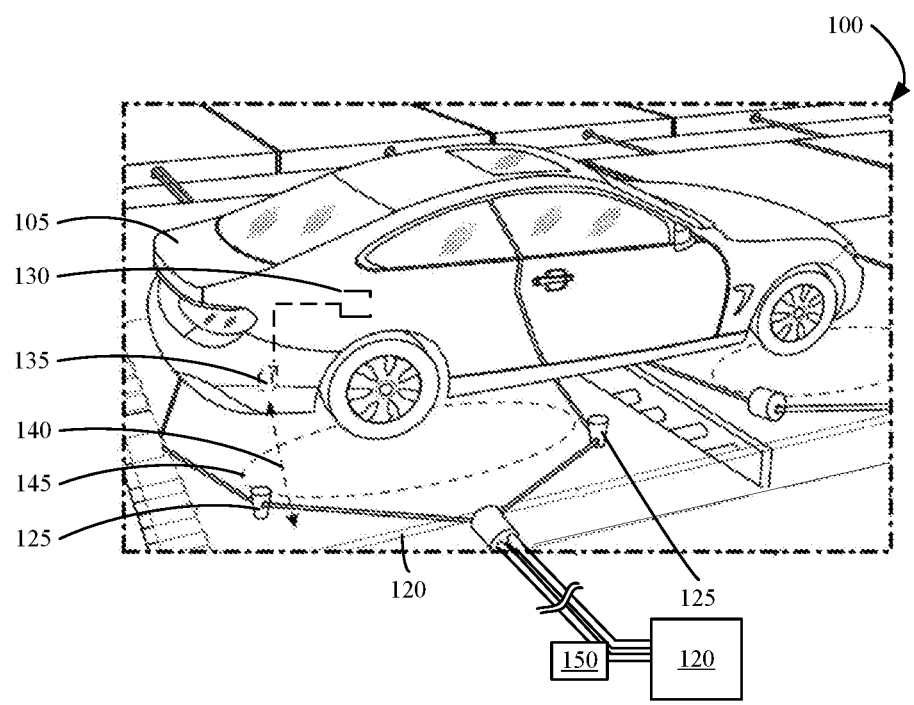
FIG. 1 depicts communication between a vehicle and a computer controller associated with a smart road in accordance with an embodiment.

The systems and methods disclosed herein are directed to smart roads that include light emitting diode (LED) lane dividers, or other optical elements, instead of conventional reflective lane dividers. The smart roads can be configured with computer controllers that dynamically update the LEDs based on information broadcast by transceivers installed onboard the vehicles that use the smart roads. The vehicles may transmit information through a "vehicle-to-meshed LED" network. The information can include lane marking distances, vehicle types, numbers of lanes required for particular vehicle types, requests for specialty color schemes on the roadway, and other data. In one example, the LEDs may change the lane divider color to red or blue if an emergency vehicle is approaching. In another example, the controllers may utilize the LEDs to automatically adjust a number of lanes that may be used in a particular direction based on the time of day and/or vehicle traffic level.

In some embodiments, the controllers may illuminate the LED lane markers when a vehicle configured to broadcast a communicative signal is approaching. For example, the LEDs within a few hundred feet of an oversized vehicle may be automatically adjusted so that the vehicle is provided with an extra wide lane, whereas the vehicles traveling behind the oversized vehicle would continue to see the original normal-sized two-lane configuration.

In some embodiments of the present disclosure, a method can include positioning one or more roadway sensors and a plurality of a networked array of light emitting diodes (LEDs) into a smart road. The LEDs may be configured as raised pavement markers on the surface of the smart road. Sensors proximate to the road may be associated with a network of road marking controllers that together cooperate to control the LEDs as vehicles drive on the smart road. The LEDs can operate as a networked array of roadway lane marking lights. The road marking controller(s) may determine a distance between a vehicle traveling on the road and the roadway sensor, determine a dynamic condition associated with the vehicle that changes with respect to time, and light the plurality of LEDs on the smart road within a predetermined range of the vehicle based at least in part on the distance between the vehicle and the roadway sensor and the dynamic condition associated with the vehicle. Dynamic conditions for operating the LED lighting scheme can include vehicle velocity, a date, a time, weather conditions proximate to the vehicle, and other factors. In some aspects of embodiments described herein, the techniques and hardware described may lead to a reduction of vehicular traffic accidents because the vehicular range of view is not unduly impeded by blind spots. In other aspects, a disclosed method includes positioning one or more roadway sensors and a networked array of light emitting diode (LED) raised pavement markers (RPMs) on a smart road. Sensors proximate to the road are associated with a network of road marking controllers that together cooperate to control the LEDs as vehicles drive on the road. The LEDs may be configured and/or programmed to operate as a networked array of roadway lane marking lights. A plurality of road marking controller(s) may determine distances between particular vehicles on the road and the roadway sensors. The smart road controllers may also determine dynamically-changing traffic conditions associated with the vehicle that change with respect to time of day, and light the plurality of LEDs based at least in part on a predetermined distance between the vehicle and the roadway sensor and the dynamic condition associated with the vehicle. Dynamic conditions for operating the LED lighting scheme can include vehicle velocity vector, date information, time information, weather conditions proximate to the vehicle, and other factors. Disclosed embodiments may reduce traffic accidents by providing dynamic illuminated road markings that adapt to traffic, vehicle types, and emergency situations.

These and other advantages of the present disclosure are provided in greater detail herein.

Illustrative Embodiments

The disclosure will be described more fully hereinafter with reference to the accompanying drawings, in which exemplary embodiments of the disclosure are shown, and which are not to be construed as limiting.

FIG. 1 illustrates a schematic view of a smart road system 100 and a vehicle(s) 105 disposed proximate to the smart road system 100. As used herein, a "smart road" and "smart pavement" may refer to a road and/or road portions configured to communicate information about objects interacting with the road, such as information about one or more vehicle(s) 105 disposed thereon. The smart road system 100 may also share information with the vehicle(s) 105 by sending and/or receiving digital communications via one or more wireless transceivers embedded in the smart road and/or integrated with a road marking controller(s) 120. In certain instances, a plurality of smart pavement panels can be joined together to form a road network. The road network can be configured to receive signals from one or more vehicle(s) 105. The road network 106 can relay the signals or instructions obtained from the signals to other nearby vehicle(s) 105 or equipment on the road. For example, the road network 106 may include a number of transmitters disposed about each of the smart pavement panels for communicating with vehicles thereon. The transmitters may also communicate with other computing devices over a network, (e.g., cellular, satellite, Wi-Fi, Bluetooth®, near field communication (NFC), etc.).

As used herein "smart" devices and objects may refer to objects configured for and/or programmed to dynamically change at least one property as an interactive response to an input from various agents such as, for example, one or more other smart devices, computing systems, objects, people, animals, environmental conditions, etc. Smart devices and objects generally include one or more onboard data processor(s) and instructions for performing one or more acts in a practical application. For example, smart devices and objects may include and/or be embedded with processors, sensors, software, etc. and have data connectivity that allow data to be exchanged between the onboard processor(s) and other systems. Smart device connectivity also enables some features of the product to exist remotely from the physical device, in what is known as the product cloud. The data collected from these products can then be analyzed to inform decision-making, enable operational efficiencies and continuously improve the performance of products, improve functionality of computing system(s), enhance safety in the operational environment, and provide other practical benefits in the application of the smart devices with respect to the embodiments disclosed herein.

The smart road system 100 may be a smart object as introduced above, and as such, may include one or more road marking controller(s) 120 communicatively coupled with one or more sensor(s) 125 disposed proximate a driving surface 145 for the vehicle(s) 105. An automotive computing system 130 installed onboard the vehicle(s) 105 may wirelessly communicate information such as, for example, vehicle information 150, with the road marking controller(s) 120 using one or more transmitter(s) 135. The wireless communications may take place via one or more wireless communication channel(s) 140, which may be and/or include encrypted and non-encrypted packets. The wireless communication channel(s) 140 may be formed between the automotive computing system 130 and/or the transmitter(s) 135, and the road marking controller(s) 120 via the sensor(s) 125 as the vehicle(s) 105 drives on the driving surface 145 of the smart road system 100.

The transmitter(s) 135 may be "radio-frequency identification (RFID) devices that can include digital data encoded in RFID tags or smart labels that may be captured by a RFID reader through radio waves. For example, the vehicle information 150 may be encoded as smart label information stored directly on the transmitter(s) 135. In one example embodiment, the RFID tags may be passive such that they are configured to receive passive energy from a nearby RFID reader (e.g., the automotive computing system 130 and/or the sensor(s) 125). In another embodiment, the RFID tags may be active tags in that they are configured to receive energy from a wired computing system attached to the devices.

In another embodiment, the transmitter(s) 135 may be configured to communicate the vehicle information 150 using other wireless communication protocols. For example, the transmitter(s) 135 may be one or more cellular telecommunications transceiver(s), a Wi-Fi transceiver, a Bluetooth® transceiver, a near field communication (NFC) transceiver, etc., where the vehicle information 150 is stored in computer-readable memory (not shown in FIG. 1) associated with the automotive computing system 130.

Figure 2:
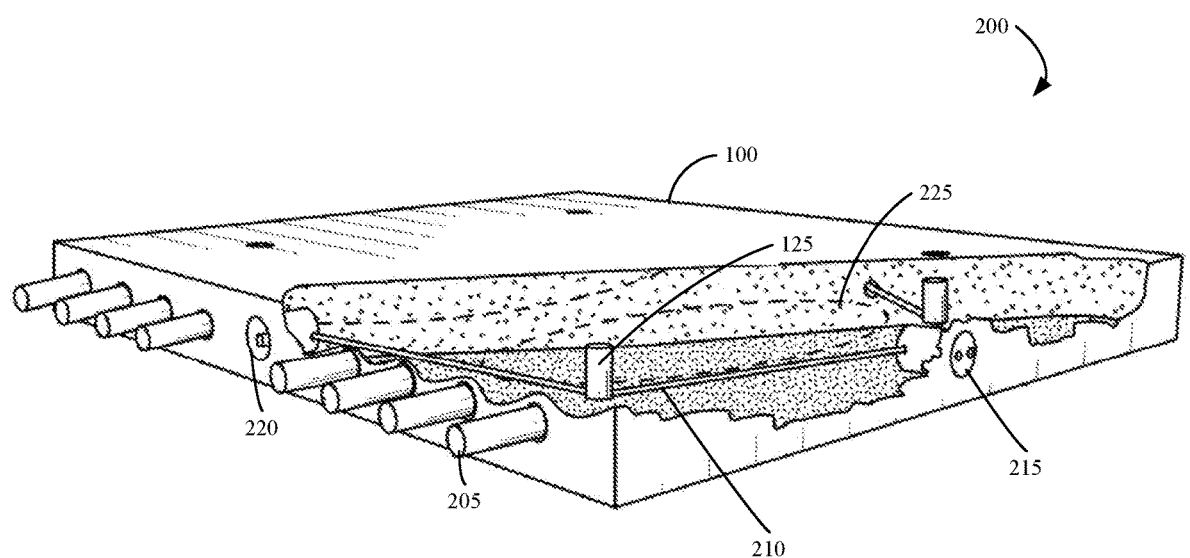
FIG. 2 depicts a partial cross-section of a patch of pavement in the smart road of FIG. 1 in accordance with an embodiment.

FIG. 2 depicts a partial cross-section of a smart road portion 200, which may be a panel/portion of the smart road system 100, in accordance with an embodiment. The smart road system 100 may include one or more locating pin(s) 205, the one or more sensor(s) 125 connected in a network, and one or more access port(s) 215 and 220 for communicatively coupling the sensor(s) 125 with the road marking controller(s) 120 (depicted in FIG. 1).

In one embodiment, the smart road portion 200 may be configured as one or more modular panels that may be fabricated on or off-site and installed together on the topmost surface of the smart road system 100. In an embodiment, the one or more locating pin(s) 205 can mate with matching locating conduits that connect multiple smart road portions. The locating pin(s) 205 may also align the smart road portion 200 with an adjacent connecting smart road portion (not shown in FIG. 2) such that the access port(s) 215 and/or 220 are aligned with mating port(s) (not shown in FIG. 2).

For example, the smart road portion 200 is shown with a plurality of access ports, including the access port 215 and the access port 220. The access port(s) 215 and 220 may house one or more sensors, processors, antennae, or other equipment (not shown in FIG. 2) for road marking control and other control aspects of the smart road system 100. The access ports 215 and 220 can be accessed, for instance, during road maintenance and upkeep.

In another embodiment, the smart road portion 200 can include a vehicle detection system 210. The vehicle detection system 210 can be adapted to detect the presence or location of one or more vehicle(s) 105 relative to the pavement patch 225. In a particular embodiment, the vehicle detection system 210 can include a fiber optic strain mesh laminated to the slab of the pavement patch 225. The fiber optic strain mesh can be adapted to detect the position of vehicle tires (not shown in FIG. 2) relative to the smart road portion 200.

Figure 3:
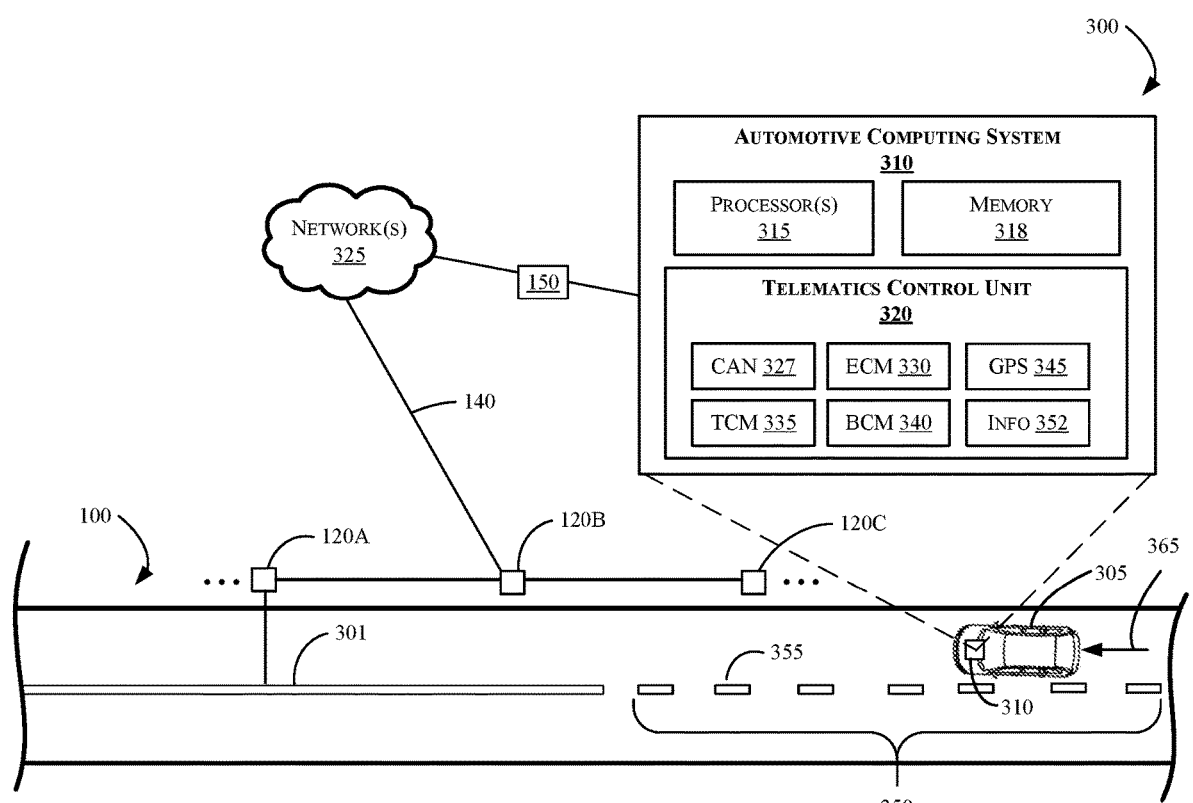
FIG. 3 depicts an illustrative smart road computing environment in which methods and structures for providing the examples disclosed herein may be implemented.

FIG. 3 depicts an illustrative smart road computing environment 300 in which example embodiments disclosed herein may be implemented. The computing environment 300 can include one or more vehicle(s) 305, an automotive computing system 310 onboard the vehicle(s) 305, and a smart road system 100, which may include a plurality of road marking controller(s) 120A, 120B, and 120C (collectively "road marking controller(s) 120"). The road marking controller(s) 120 may be communicatively coupled with the vehicle(s) 305 via one or more network(s) 325, which may communicate the vehicle information 150 via one or more wireless communication channel(s) 140.

The vehicle(s) 305 may be substantially similar and/or identical to the vehicle(s) 105 depicted in FIG. 1. Although illustrated as a passenger vehicle, the vehicle(s) 305 may take the form of another type of private passenger vehicle or commercial vehicle configured with the transmitter(s) 135 described in FIG. 1. For example, the vehicle(s) 105 and/or 305 may be a car, a truck, a sport utility vehicle, a crossover vehicle, a van, a minivan, a taxi, a bus, construction equipment, emergency equipment, etc. Further, the vehicle(s) 305 may be a manually driven vehicle, and/or be configured to operate in a fully autonomous (e.g., driverless) mode or partially autonomous mode.

Figure 4:
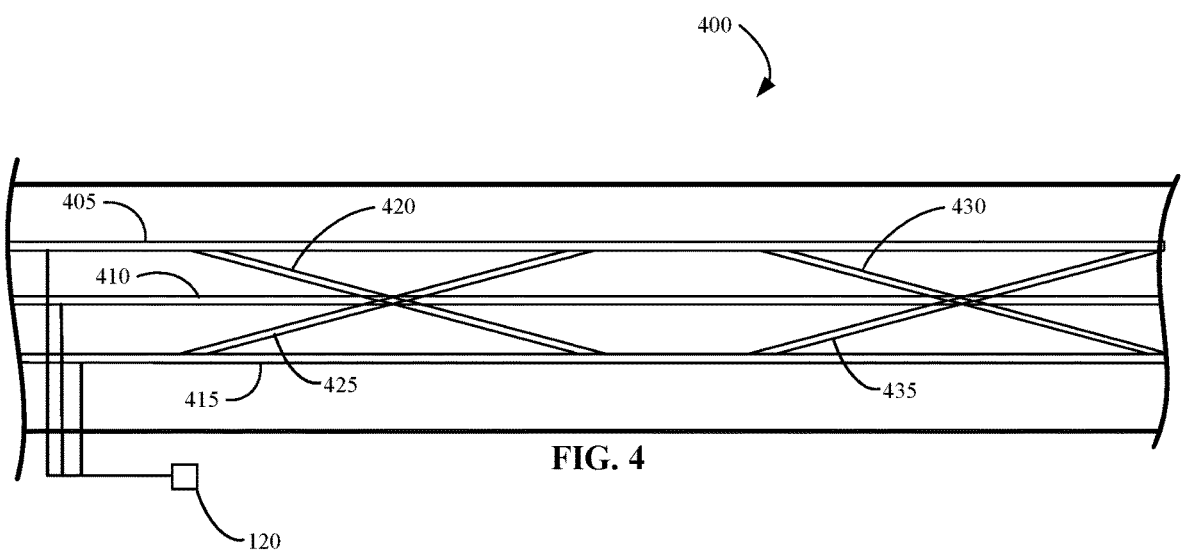
FIG. 4 depicts an example smart road with a computer-controlled network of raised pavement markers in accordance with an embodiment.

The road marking controller(s) 120, described in greater detail with respect to FIG. 4, may communicate with the vehicle(s) 305 through the one or more wireless communication channel(s) 140. The wireless transmitter(s) (not shown in FIG. 3) may communicate the vehicle information 150 using a wireless communication network configured and/or programmed to create the wireless communication channel(s) 140, such as, for example, the network(s) 325.

The network(s) 325 depicted in FIG. 3 are an illustration of one possible communication infrastructure in which the connected devices in the computing environment 300 may communicate with each other. The network(s) 325 may be or include networks such as the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. Moreover, in some aspects, the network(s) 325 may include near field communication protocols.

The automotive computing system 310 may include one or more processor(s) 315 and a computer-readable memory 318. The automotive computing system 310 may also include or be communicatively connected with a telematics control unit 320.

The automotive computing system 310 may be installed in an engine compartment of the vehicle(s) 305 (or elsewhere in the vehicle(s) 305). The automotive computing system 310 may include, in one example, the one or more processor(s) 315, and a computer-readable memory 318. For the sake of simplicity, the computing system architecture depicted in the automotive computing system 310 may omit certain computing architectures and controlling modules. In other example embodiments, the telematics control unit 320 may be integrated with and/or be incorporated with the automotive computing system 310. It should be readily understood that the computing environment depicted in FIG. 3 is one example of a possible implementation according to the present disclosure, and thus, it should not to be considered limiting or exclusive.

The telematics control unit 320 can include communication and control access to a plurality of vehicle computing modules such as, for example, a Controller Area Network (CAN) bus 327, one or more Engine Control Modules (ECMs) 330, a Transmission Control Module (TCM) 335, and/or a Body Control Module (BCM) 340. The telematics control unit 320 may also include a Global Positioning System (GPS) 345, and/or an infotainment system 352. Control and/or communication with other control modules not shown is possible, and such control is contemplated.

In some aspects, the telematics control unit 320 may control aspects of the vehicle(s) 305 through the control modules 327-352 and implement one or more instruction sets (not shown in FIG. 3) for controlling the smart road system 100. For example, the ECM 330 may determine vehicle path information, vehicle direction information, engine speed, etc., which may be used to instruct the smart road system 100. More particularly, the automotive computing system 310 may automatically generate instructions and transmit those instructions to the road marking controller(s) 120 such that interactive LEDs on the roadway respond according to dynamically changing factors such as velocity vector(s) of the vehicle(s) 305. In other aspects, the telematics control unit 320 may use the GPS to determine velocity vectors, vehicle position, and other information, and generate the vehicle information 150 for broadcasting to the road marking controller(s) 120.

The one or more processor(s) 315 may utilize the memory 318 to store programs in code and/or to store data for performing aspects of the present disclosure, such as, for example, receiving from the memory 318, a vehicle message that includes a vehicle identification (ID) associated with the vehicle(s) 305, and broadcasting the vehicle message, via the wireless communication channel(s) 140. The memory 318 may be a non-transitory computer-readable memory.

The memory 318 may be one example of a non-transitory computer-readable medium, and may be used to store programs in code and/or to store data for performing various operations in accordance with the disclosure. The instructions in the memory 318 can include one or more separate programs, each of which can include an ordered listing of computer-executable instructions for implementing logical functions. In another exemplary implementation, some or all components of the automotive computing system 310 may be shared with the telematics control unit 320.

The memory 318 may store various code modules such as, for example, a secure communication controller (not shown in FIG. 3) for establishing the one or more wireless communication channel(s) 140 (which may, in some embodiments, be encrypted channel(s)) between the road marking controller(s) 120 and the automotive computing system 310.

In one embodiment, the vehicle(s) 305 may broadcast the vehicle message via at least one wireless communications module (e.g., the transmitter(s) 135 depicted on FIG. 1) onboard the vehicle(s) 305 and in communication with automotive computing system 310. The vehicle message can include, for example, a vehicle type for the vehicle(s) 305, and a lighting condition for lighting a plurality of light emitting diodes (LEDs) installed as part of the smart road system 100. For example, as the vehicle(s) 305 approaches the road marking controller 120C, the vehicle(s) 305 may broadcast a vehicle message indicating that, among other things, the vehicle(s) 305 is a passenger vehicle that uses a single lane, is traveling with a velocity vector 365, and requests a particular lane marking distance 350, which may be an approximate distance from a present location of the vehicle(s) 305 to a predetermined distance (e.g., measured in feet, meters, etc.) in a relative direction identified by the velocity vector 365. Accordingly, in one example, the road marking controller(s) 120 may change an unlit section 355 of the smart road system 100 to a lit section that is appropriate for the approaching vehicle(s) 305.

The smart road system 100 may include an array of light emitting diodes (LEDs) configured as a strip or series of strips that can be controlled to mark lane divisions on the road. For example, the lane divisions 350, depicted as standard dashed lines indicating that passing is possible, can be dynamically changed to other types of lane markings, such as a solid line 301, indicating that passing is not permissible. In other aspects, the color of the lane markings may be changeable, e.g., from yellow to white, red, and other colors that provide useful information to drivers.

FIG. 4 depicts an example smart road system 400 with a computer-controlled network of raised pavement markers, in accordance with an embodiment. The smart road system 400 may be substantially similar and/or identical to the smart road system 100 described in the prior figures. The system 400 may include, for example, a plurality of LED array strips including 405, 410, 415, 420 425, 430, and 435. The LED array strips 405-435 may be configured in any conceivable configuration that allows dynamic control of individual LEDs in the strips to mark lane information, navigational information, safety information, etc., on the smart road when instructed by the road marking controller(s) 120. For example, in one embodiment, the array strips 420, 425, 430, and 435 may provide means for marking turn lanes at one time of the day, and may stay unlit to provide through lanes during other times of the day. Other configurations are possible, and contemplated.

The LED array strips 405-435 may include a networked array of individually controllable LEDs that may be dynamically changeable using the road marking controller(s) 120.

Figure 5:
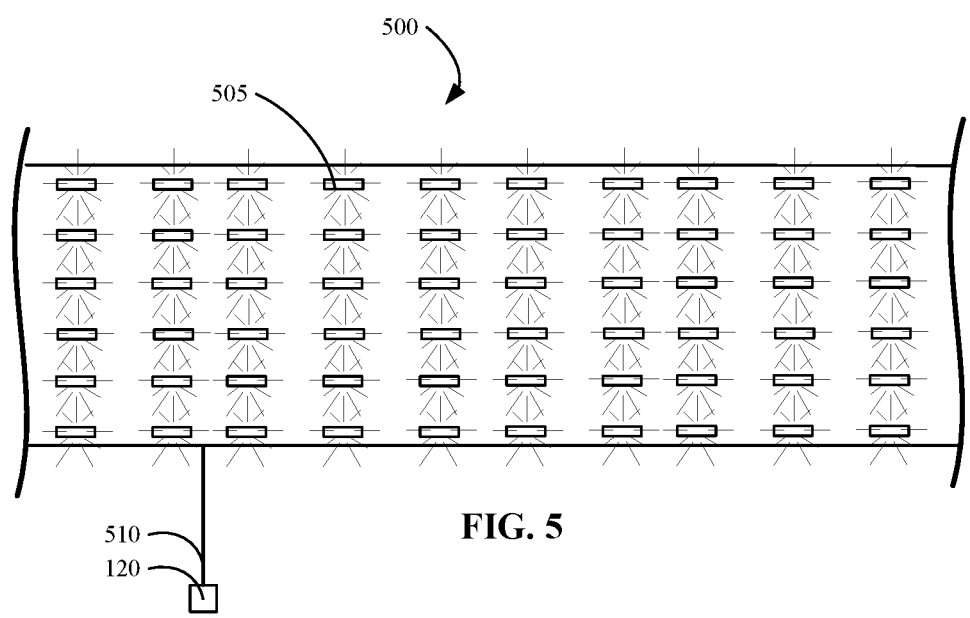
FIG. 5 depicts an example network of raised pavement markers in accordance with an embodiment.

FIG. 5 depicts an example array of LEDs that may be part of the computer-controlled network of raised pavement markers of FIG. 4, in accordance with an embodiment. In an example embodiment, a plurality of LEDs 505 are arranged in a rectangular array pattern. The plurality of LEDs are connected together and to the road marking controller(s) 120 via a LED bus 510. The configuration depicted in FIG. 5 is for example only, and is not to be construed as limiting in number, configuration, and/or shape. It should be appreciated that any arrangement for the LED arrays described herein is possible, and contemplated. It is further contemplated that the raised pavement markers may be arrayed on a durable mesh fabric or other material that can be adhered, embedded, or otherwise disposed on a surface of the smart road system 100.

Figure 6:
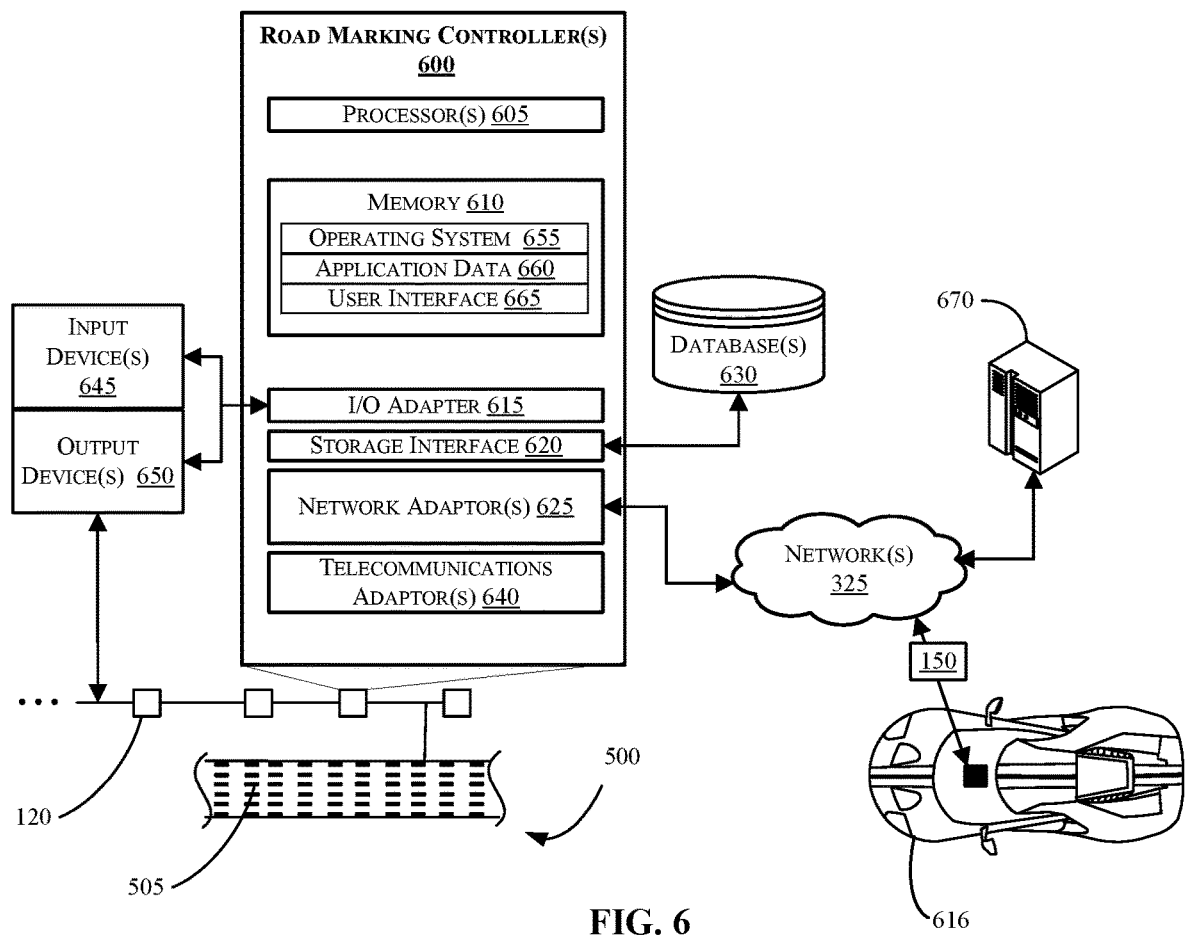
FIG. 6 depicts an example smart road marking controller in accordance with an embodiment.

FIG. 6 depicts an example smart road marking controller 600 that may be used to control the array of LEDs 500. The one or more smart road controller(s) 600 may be substantially similar to and/or identical to the road marking controller(s) 120 described herein. The environment and system of FIG. 6 as described herein can be implemented in hardware, software (e.g., firmware), or a combination thereof.

As shown in FIG. 6, a road marking controller(s) 600 may include the one or more processor(s) 605, memory 610 communicatively coupled to the one or more processor(s) 605, and one or more input/output adapters 615 that can communicatively connect with external devices. The road marking controller(s) 600 may operatively connect to and communicate information with one or more internal and/or external memory devices such as, for example, one or more databases 630 via a storage interface 620. The road marking controller(s) 600 may include one or more network communications adapter(s) 625 enabled to communicatively connect the road marking controller(s) 600 with one or more network(s) 325. In some example embodiments, the network(s) 325 may be or include a telecommunications network infrastructure. In such embodiments, the road marking controller(s) 600 can further include one or more telecommunications adaptor(s) 640. The road marking controller(s) 600 may further include and/or connect with one or more input devices 645 and/or one or more output devices 650 through the I/O adapter(s) 615.

The one or more processor(s) 605 are collectively a hardware device for executing program instructions (aka software), stored in a computer-readable memory (e.g., the memory 610). The one or more processor(s) 605 can be a custom made or commercially-available processor, a central processing unit (CPU), a plurality of CPUs, an auxiliary processor among several other processors associated with the smart road controller(s) 600, a semiconductor based microprocessor (in the form of a microchip or chip set), or generally any device for executing computer instructions.

The one or more processor(s) 605 may be disposed in communication with one or more memory devices (e.g., the memory 610 and/or one or more external databases 630, etc.) via a storage interface 620. The storage interface 620 can also connect to one or more memory devices including, without limitation, one or more databases 630, and/or one or more other memory drives (not shown in FIG. 6) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 610 can include any one or a combination of volatile memory elements (e.g., dynamic random access memory (DRAM), synchronous dynamic random access memory (SDRAM), etc.) and can include any one or more nonvolatile memory elements (e.g., erasable programmable read only memory (EPROM), flash memory, electronically erasable programmable read only memory (EEPROM), programmable read only memory (PROM), etc.

The instructions in the memory 610 can include one or more separate programs, each of which can include an ordered listing of computer-executable instructions for implementing logical functions. In the example of FIG. 6, the instructions in the memory 610 can include an operating system 655. The operating system 655 can control the execution of other computer programs such as, for example a LED light array driver that translates predetermined patterns for lighting road marking configuration(s) into computer-executable control signals. The operating system 655 may provide scheduling, input-output control, file and data management, memory management, and communication control and related services.

The program instructions stored in the memory 610 can further include application data 660, and instructions for controlling and/or interacting with the computer through a user interface 665. For example, the memory 610 can include program instructions for determining a distance between the vehicle 616 and one or more roadway sensor(s) (e.g., the sensor(s) 125 depicted with respect to FIG. 1), for determining a dynamic condition associated with the vehicle 616 that changes with respect to time, and for controlling the plurality of LEDs based at least in part on the distance between the vehicle 616 and the sensor(s) 125 and the dynamic condition associated with the vehicle 616. In other aspects, the program instructions stored in the memory 610 may cause the processor(s) 605 to receive a vehicle message (e.g., the vehicle information 150), which may include a vehicle ID and other information, and control the array of LEDs 500 (which may include any number of the plurality of LEDs 505) based at least in part on the vehicle information 150.

The I/O adapter 615 can connect a plurality of input devices 645 to the smart road controller(s) 600. The input devices can include, for example, a keyboard, a mouse, a microphone, a sensor, etc. The output device 650 can include, for example, a display, a speaker, a touchscreen, etc.

The I/O adapter 615 can further include a display adapter coupled to one or more displays. The I/O adapter 615 can be configured to operatively connect one or more input/output (I/O) devices 645, 650 to the smart road controller(s) 600. For example, the input device 645 can connect a keyboard and mouse, a touchscreen, a speaker, a haptic output device, or other output device including, for example, the array of LEDs 500. The output devices 650 can include but are not limited to a printer, a scanner, the array of LEDs 500, and/or the like. Other output devices can also be included, although not shown in FIG. 6. Finally, the I/O devices connectable to the I/O adapter 615 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some example embodiments, the smart road controller(s) 600 can include a mobile communications adapter 640. The mobile communications adapter 640 can include a global positioning system (GPS), cellular, mobile, and/or other communications protocols for wireless communication.

The network(s) 325 may be the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The one or more network(s) 325 can be an IP-based network for communication between the smart road controller(s) 600 and any external device. The network(s) 325 may transmit and receive data between the smart road controller(s) 600 and devices and/or systems external to the smart road controller(s) 600. For example, network(s) 325 may transmit the vehicle information 150 from the vehicle 616 to one or more of the road marking controller(s) 120 and/or a remote server 670 that may be configured to provide master control of the road marking controller(s) 120. The network(s) 325 can also be and/or include a packet-switched network such as a local area network, wide area network, metropolitan area network, the Internet, or other similar type of network environment.

The network(s) 325 can operatively connect the processor(s) 605 to one or more devices including, for example, the various road marking controller(s) (e.g., the road marking controller(s) 120) with which the road marking controller(s) 600 may be networked. The network(s) 325 can also connect the smart road controller(s) 600 to one or more servers such as, for example, the server 670.

Figure 7:
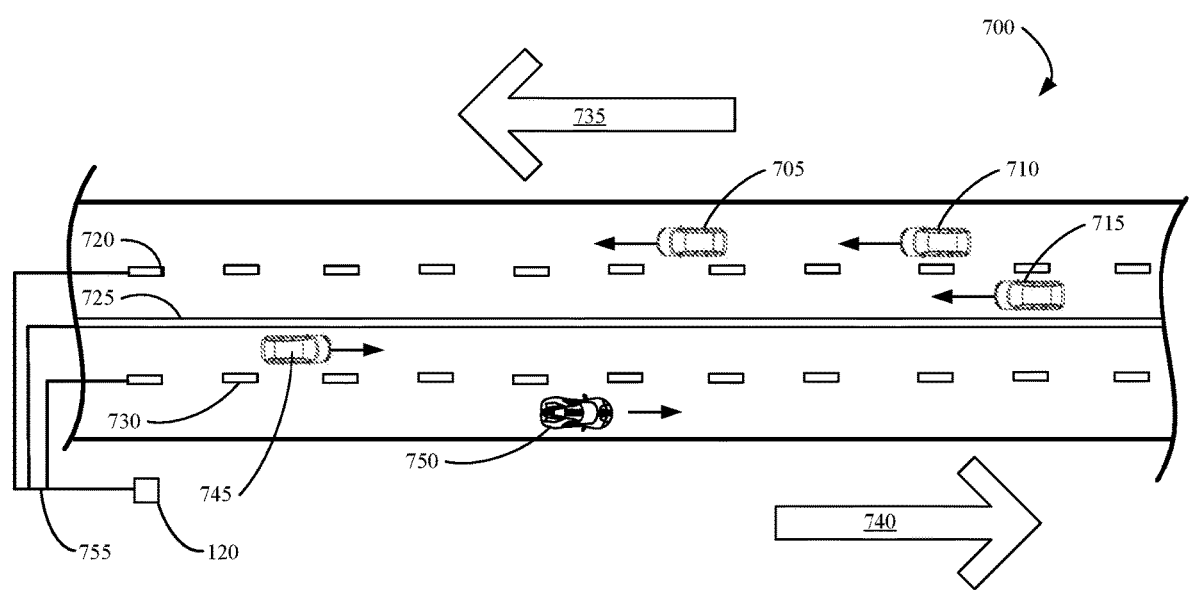
FIG. 7 depicts an example smart road and computer-controlled network of raised pavement markers in accordance with an embodiment.
Figure 8:
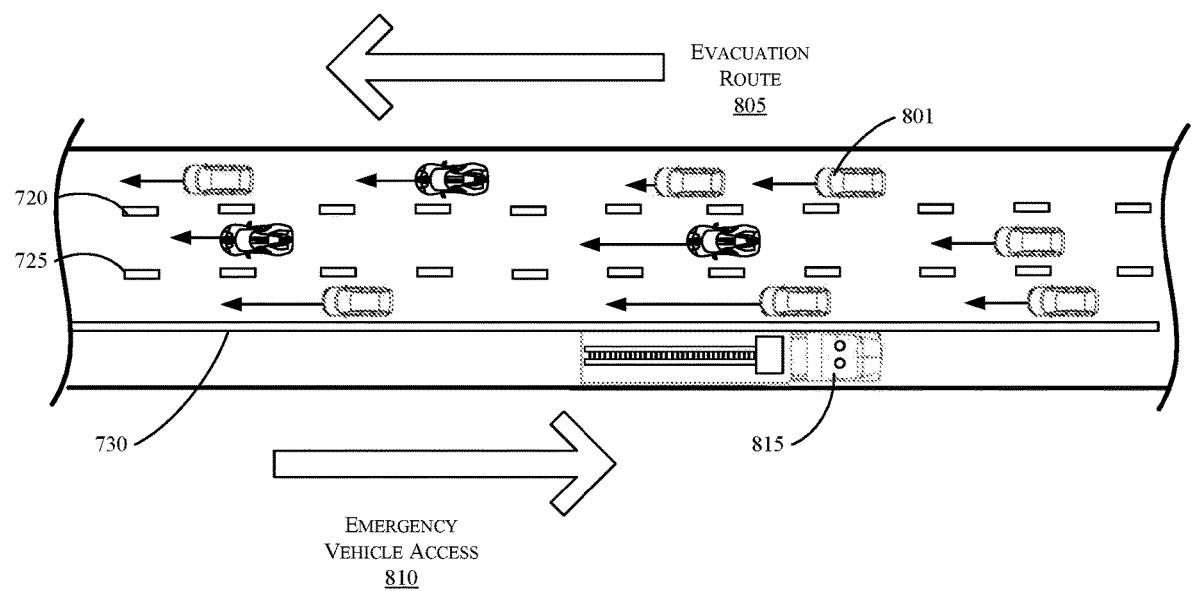
FIG. 8 depicts another smart road configuration according to an embodiment of the present disclosure.
Figure 9:
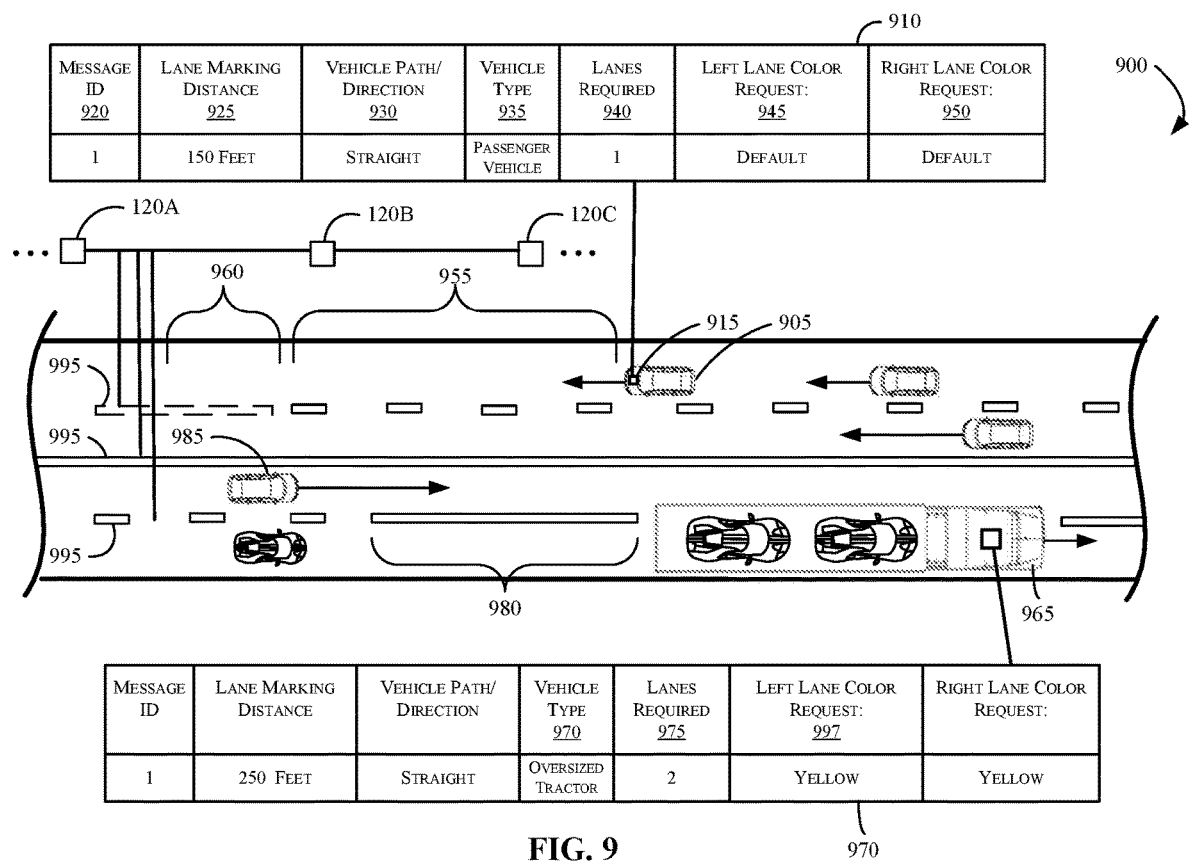
FIG. 9 depicts another smart road configuration according to an embodiment of the present disclosure.

FIGS. 7-9 depict various configurations for controlling the plurality of LEDs 505. Looking first at FIG. 7, in one embodiment, a plurality of vehicles that include vehicles 705, 710, and 715 are depicted on a smart road system 700, in accordance with an embodiment. The smart road system 700 may be substantially similar to and/or identical to the smart road system 100 of FIG. 1. Looking first at FIG. 7, a smart road system 700 is depicted as including three LED array strips 720, 725, and 730 that together form four lanes of traffic (Lane 1, Lane 2, Lane 3, and Lane 4, respectively). The center LED array strip 725 may be configured to be a solid (non-passing) lane divider when traffic is generally substantially equal in two directions (west-bound traffic 735 and east-bound traffic 740). The two passing lane dividers formed by the top LED array strip 720 and the bottom LED array strip 730 are configured as passing lanes for the west-bound traffic 735 and the east-bound traffic 740, respectively. In one aspect, the road marking controller(s) 120 may connect with the LED array strips 720-730 via a LED bus 755. The road marking controller(s) 120 may alter the configuration of the LED array strips 720-730 based on various desired patterns of configuration. Selecting the pattern may include using a default pattern (e.g., the pattern shown in FIG. 7 or another), determining a volume of traffic in one or more directions, determining a vehicle distance between the vehicle and a roadway sensor, determining a dynamic condition associated with the vehicle(s) with respect to time, and/or receiving a control signal from a remote server (e.g., the server 670 depicted in FIG. 6).

The remote server 670 may control the smart road system 700 based on known emergency situations, for example. In one aspect, if a hurricane or other dangerous weather is approaching from the east, and evacuation is taking place, it may be beneficial to control the plurality of LEDs centrally such that entire geographic regions may be consistently and specifically evacuated. For example, FIG. 8 depicts an illustrative emergency situation where west-bound traffic is configured as an evacuation route 805, and east-bound traffic is configured as an emergency vehicle access route 810. In this example, the control mechanism may be the server 670, and/or the road marking controller(s) 120.

In another embodiment, an emergency vehicle 815 may generate the control signal that causes the road marking controller(s) 120 (not shown in FIG. 8) to control the plurality of LEDs based at least in part on the roadway marking pattern for lighting a plurality of LEDs (e.g., the LED array strips 720-730) to form a LED roadway marking pattern.

FIG. 9 depicts an embodiment of a smart road system 900 which may include a plurality of LED arrays 995 that are operatively connected with one or more road marking controller(s) 120. Various vehicles traveling on the road system 900 may communicate identifying information associated with their respective vehicles (described in part in various figures as the vehicle information 150.) to the road marking controller(s) 120 via the wireless communication channel(s) 140 (FIG. 1). Two detailed examples of vehicle information are provided, including the vehicle information 910 and the vehicle information 970.

As depicted in FIG. 9, the road marking controller(s) 120 may use the vehicle information 910 and 970 to determine appropriate lighting patterns for the LED road markers, and generate the control mechanisms that dynamically change the LED arrays 995 according to traffic and other inputs. For example, a vehicle 905 may be configured and/or programmed to transmit vehicle information 910 stored in a computer memory of an automotive computing system 915, by broadcasting the signal to one or more listening sensor(s) (e.g., the sensor(s) 125 in FIG. 1). The sensor(s) 125 may be embedded in the smart road system 900 as shown in FIGS. 1 and 2. In other embodiments, the vehicle information 910 and/or 970 may be encoded directly into the transmitting mechanisms such as in the case of passive RFID tag transmitter(s).

In some embodiments, the vehicle information 910 and/or 970 may include data for instructing the road marking controller(s) 120 to determine, based at least in part on the vehicle information 910, a roadway marking pattern for lighting a plurality of LEDs (e.g., 505) associated with the roadway marker(s). The LED arrays 995 include the plurality of LEDs that may remain unlit or dark until they receive a control signal from the road marking controller(s) 120. It should be appreciated that, although the LED arrays 995 are depicted in FIG. 9 as having various patterns, dashes, etc., in the unlit state the LED arrays are depicted as white space. The roadway markers are the lane dividers and other roadway markings needed to control the flow of traffic on the roadway.

The data can include a message ID 920 that uniquely identifies a vehicle message and/or a particular vehicle 905, a lane marking distance 925 that determines a distance required or requested for marking the roadway, a vehicle path and/or direction 930 that indicates a direction (and/or a velocity vector) for the vehicle 905, a vehicle type 935 for the vehicle 905, a number of lanes required 940 for the vehicle 905, and color information 945, 950 associated with the lane marker request.

Using the vehicle 905 as an example, the automotive computing system 915 and/or the transmitters(s) onboard the vehicle 905 (not shown in FIG. 9) may transmit the vehicle information 910 to any sensor(s) of the smart road system 900 listening for the signal(s). The road marking controller(s) 120 may determine a distance between the vehicle 905 and a roadway sensor by comparing time-incremented signal samples, and calculating vehicle velocity based on a starting and ending position of the vehicle with respect to time. Although this disclosure omits certain details of the distance calculation for the sake of brevity, it is appreciated that determining distances between stationary sensors and moving objects is known in the art of signal processing, and thus, not substantively relevant to discussion of the instant embodiment. In some embodiments, the road marking controller(s) 120 may determine a dynamic condition associated with the vehicle 905, which may change with respect to time, such as, for example, the vehicle path direction 930 (provided by the vehicle computer), and/or a calculated velocity vector for the vehicle 905.

In some aspects, the dynamically changing information may include a calendar date value such as the holiday Memorial Day which can be historically indicative of particularly heavy traffic in, for example, a single direction of travel. In other aspects, the dynamically changing information may be and/or include a time value (e.g., at time at which rush hour traffic is expected to begin). In other aspects, the dynamically changing information may include a value indicative of a weather condition proximate to the vehicle 905. For example, in heavy rain conditions, it may be prudent to limit passing ability between lanes, or to change a color or light intensity associated with the LEDs. Accordingly, controlling the plurality of LEDs based at least in part on the distance between the vehicle and the first roadway sensor and the dynamic condition associated with the vehicle can include changing a light intensity, a voltage supplied to the LEDs, a color of output light using the LEDs, and other changeable factors.

In another example for control of the road markers, the road marking controller(s) 120 may pass control of the plurality of LEDs from a first road marking controller (e.g., 120C) to a second road marking controller (e.g., 120B, 120A, etc.) based at least in part on one or more of an updated distance between the vehicle 905, the first roadway sensor (not shown in FIG. 9), and the distance between the vehicle 905 and a second roadway sensor (not shown in FIG. 9). It should be appreciated that distances between the vehicle 905 and the roadway sensor(s) can indicate relative vehicle velocities and position, such that a vehicle that has passed a controlling road marking controller may still benefit from road marker control even after having passed the controller, because the controlling mechanism for lighting the LEDs follows the vehicle 905 as it progresses along the route. For example, if the vehicle 905 is the only vehicle on the smart road system 900 late at night, the road markers spanning a distance 955 in front of the vehicle 905 may stay consistently lit, where the other areas of the LED array remain unlit (e.g., an unmarked LED array 960) until the vehicle 905 approaches. In some aspects, this feature may conserve power, and reduce any potential light pollution.

In another aspect, a vehicle that requires a wide berth (e.g., a tractor truck 965) may provide vehicle information 970 that includes information indicating the need for more room on the smart road system 900. For example, the lanes required field 975 may indicate the need for two lanes of traffic to accommodate a wide load. In some aspects, the road marking controller(s) 120 may provide a section 980 behind the tractor truck 965 that prevents vehicle passing, lane changes, etc. The vehicle 985 in the passing lane of traffic may see the section 980, and be alerted by the solid line as to a dangerous situation that could be created if the vehicle 985 were to attempt to pass the tractor truck 965. In other aspects, the right lane color request section of the vehicle information 970 may provide color change request information 997 for changing a color of the lane dividers. For example, emergency vehicles can the color output of the LEDs in the road markers, which may notify when the emergency vehicles are reacting to an emergency situation.

In another embodiment, a police vehicle can change lane markings to a color (e.g., blue), which may provide an advance warning that signals drivers ahead of approaching police vehicles move to a different lane. In another example, a fire truck automotive computer system may transmit automobile information configured to turn the lane markings to blue or red to signify response to an emergency situation. Other examples are possible, and contemplated.

Figure 10:
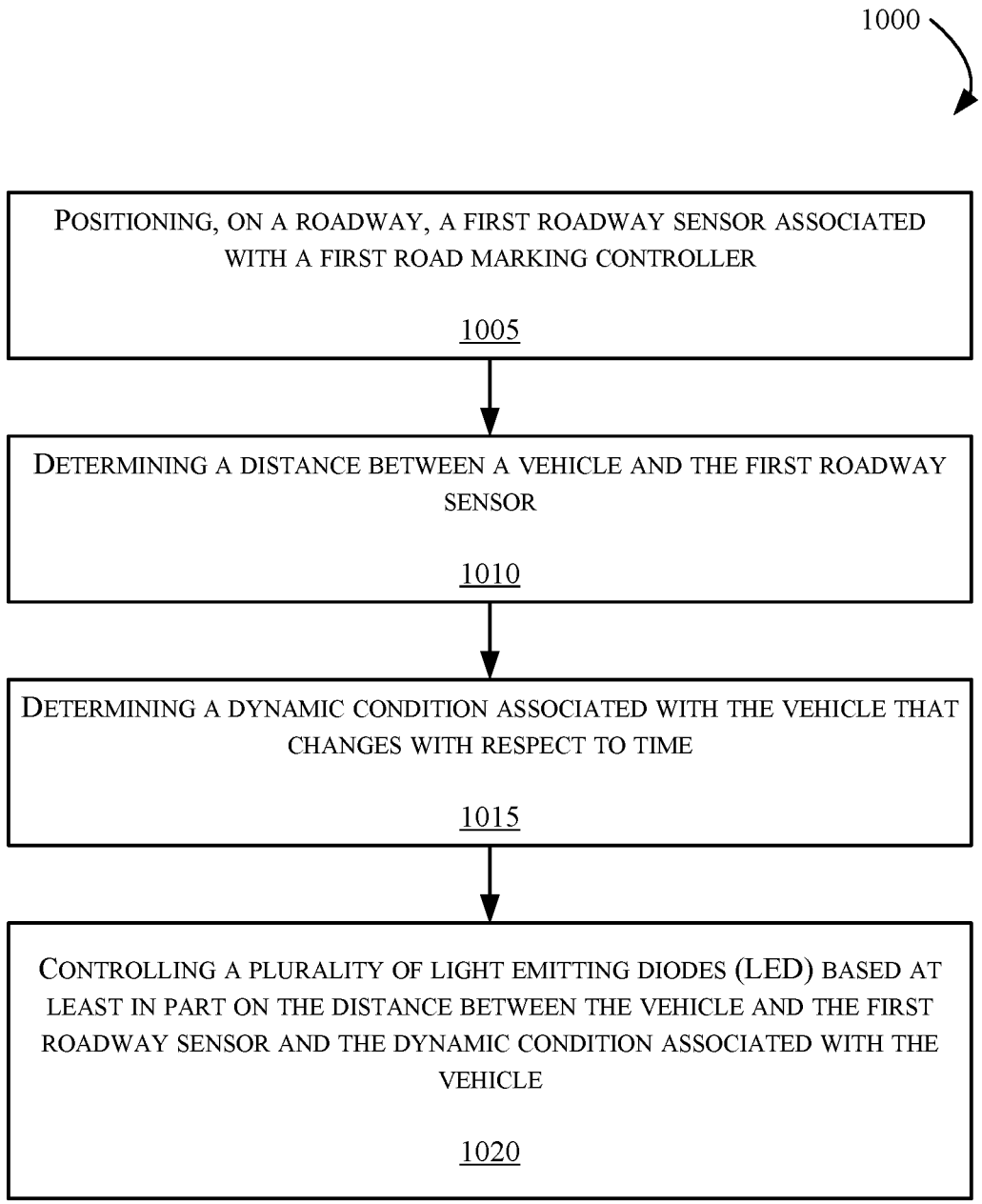
FIG. 10 is a flow diagram of an example method for controlling a smart road according to an embodiment of the present disclosure.

FIG. 10 is a flowchart of an example method 1000 of the present disclosure. The method generally includes a step 1005 of positioning a first roadway sensor associated with a first road marking controller with a plurality light emitting diodes (LEDs).

Next, the method includes a step 1010 of determining a distance between a vehicle and the first roadway sensor.

Next, the method includes a step 1015 of determining a dynamic condition associated with the vehicle that changes with respect to time.

Last, the method includes a step 1020 of determining a distance between a vehicle and the first roadway sensor controlling the plurality of LEDs based at least in part on the distance between the vehicle and the first roadway sensor and the dynamic condition associated with the vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method for controlling a plurality of dynamic pavement markings on a roadway, wherein the roadway comprises a first roadway sensor associated with a first road marking controller, the computer-implemented method comprising:
   determining a distance between a first vehicle and the first roadway sensor and a distance between a second vehicle and a second roadway sensor;
   determining a size of the first vehicle and a size of the second vehicle, wherein the size of the second vehicle is larger than the size of the first vehicle;
   controlling, based at least in part on the distance between the first vehicle and the first roadway sensor and the size of the first vehicle, a first plurality of optical elements on the roadway to create a first illuminated roadway lane around the first vehicle; and
   controlling, based at least in part on the distance between the second vehicle and the second roadway sensor and the size of the second vehicle, a second plurality of optical elements on the roadway to create a second illuminated roadway lane around the second vehicle, wherein the second illuminated roadway lane is larger than the first illuminated roadway lane, and wherein the second illuminated roadway lane is a solid line.

2. The computer-implemented method according to claim 1, further comprising determining a dynamic condition associated with the first vehicle, wherein the dynamic condition is one or more of a velocity vector of a vehicle, a date value, a time value, and a value indicative of a weather condition proximate to the first vehicle.

3. The computer-implemented method according to claim 1, wherein controlling the plurality of optical elements based at least in part on the distance between the first vehicle and the first roadway sensor comprises:
   receiving, from a vehicle computing system, a vehicle message comprising a vehicle identification (ID); and
   controlling the plurality of optical elements based at least in part on the vehicle message.

4. The computer-implemented method according to claim 3, further comprising
   determining, based at least in part on the vehicle message, a roadway marking pattern for lighting the plurality of optical elements associated with one or more roadway markers; and
   controlling the plurality of optical elements based at least in part on the roadway marking pattern for lighting the plurality of optical elements.

5. The computer-implemented method according to claim 1, further comprising:
   receiving, via a telecommunications adaptor, an instruction set comprising instructions for controlling the plurality of optical elements; and
   controlling the plurality of optical elements further based, at least in part, on an instruction set received from a server associated with the first road marking controller.

6. The computer-implemented method according to claim 1, further comprising determining, based at least in part on a vehicle message, a vehicle type associated with the first vehicle, and controlling the plurality of optical elements based at least in part on the vehicle type.

7. The computer-implemented method according to claim 1, further comprising:
   determining an updated distance between the vehicle and the first roadway sensor;
   determining a dynamic condition, wherein the dynamic condition comprises one or more of a vehicle path, a vehicle direction, and a vehicle velocity; and
   lighting one or more of the plurality of optical elements based at least in part on the updated distance between the first vehicle and the first roadway sensor and the dynamic condition.

8. The computer-implemented method of claim 7, further comprising:
   selecting a second road marking controller based at least in part on the distance between the first vehicle and the first roadway sensor and the dynamic condition; and
   passing control of the plurality of optical elements from a first road marking controller to the second road marking controller.

9. The computer-implemented method according to claim 1, further comprising:
   determining an updated distance between the first vehicle and the first roadway sensor; and
   passing control of the plurality of optical elements from the first road marking controller to a second road marking controller based at least in part on one or more of an updated distance between the first vehicle and the first roadway sensor, and a distance between the first vehicle and a second roadway sensor.

10. A computer-implemented method, comprising:
    receiving, via an automotive computing system processor onboard a vehicle, a vehicle message comprising a vehicle identification (ID) associated with the vehicle; and
    broadcasting the vehicle message via at least one wireless communications module onboard the vehicle, the vehicle message comprising:
    a vehicle type for the vehicle; and
    a lighting condition for lighting a plurality of light emitting diodes (LEDs) installed on a road, wherein the lighting condition includes controlling the plurality of light emitting diodes (LEDs) based on a direction of travel of the vehicle, wherein controlling the plurality of LEDs includes increasing a number of illuminated roadway lanes in the direction of travel, and decreasing a number of illuminated roadway lanes in an opposite direction of travel.

11. The computer-implemented method according to claim 10, wherein the vehicle message comprises information indicative of: a lane marking distance, a vehicle type, a vehicle direction, a number of lanes required, a left lane color request, and a right lane color request.

12. A system, comprising:
    a computer processor operable to execute a set of computer-readable instructions; and
    a memory operable to store the set of computer-readable instructions operable to:
    determine a distance between a first vehicle and a first roadway sensor and a distance between a second vehicle and a second roadway sensor;
    determine a size of the first vehicle and a size of the second vehicle, wherein the size of the second vehicle is larger than the size of the first vehicle;
    control, based at least in part on the distance between the first vehicle and the first roadway sensor and the size of the first vehicle, a first plurality of optical elements on the roadway to create a first illuminated roadway lane around the first vehicle; and
    control, based at least in part on the distance between the second vehicle and the second roadway sensor and the size of the second vehicle, a second plurality of optical elements on the roadway to create a second illuminated roadway lane around the second vehicle, wherein the second illuminated roadway lane is larger than the first illuminated roadway lane, and wherein the second illuminated roadway lane is a solid line.

13. The system according to claim 12, wherein the processor is configured to determine a dynamic condition including one or more of a velocity vector of a vehicle, a date value, a time value, and a value indicative of a weather condition proximate to the vehicle.

14. The system according to claim 12, wherein the processor is configured to control the plurality of LEDs based at least in part on the distance between the vehicle and the roadway sensor comprises:
    receiving, from a vehicle computing system, a vehicle message comprising a vehicle identification (ID); and
    controlling the plurality of LEDs based at least in part on the vehicle message.

15. The system according to claim 14, wherein the processor is further configured to:
    determine, based at least in part on the vehicle message, a roadway marking pattern for lighting the plurality of LEDs associated with one or more roadway markers; and
    controlling the plurality of LEDs based at least in part on a marking pattern for controlling the plurality of LEDs.

16. The computer-implemented method of claim 1, wherein the first vehicle is traveling in front of or behind the second vehicle, and wherein the computer-implemented method further comprises:
    controlling the second first plurality of optical elements on the roadway to revert the second illuminated roadway lane back to a size of the first illuminated roadway lane.

17. The computer-implemented method of claim 10, wherein increasing or decreasing the number of illuminated roadway lanes is further based on a time of day, and wherein the method further comprises controlling the plurality of LEDs to increase or decrease a number of illuminated roadway lanes in an opposite direction of travel.

18. The computer-implemented method of claim 1, wherein the roadway further comprises a plurality of roadway segments, wherein the plurality of roadway segments comprise one or more locating pins, the first roadway sensor and the second roadway sensor, one or more access ports for communicatively coupling the first roadway sensor and the second roadway sensor with the first road marking controller, and a fiber optic strain mesh.

19. The computer-implemented method of claim 1, wherein the first roadway sensor and the second roadway sensor are radio-frequency identification (RFID) readers, and wherein the first roadway sensor receives information from the vehicle through an RFID transmitter on the vehicle.

* * * * *